March 24, 1925.  E. R. FITCH  1,530,487
FLUID PRESSURE BRAKE
Filed May 19, 1923
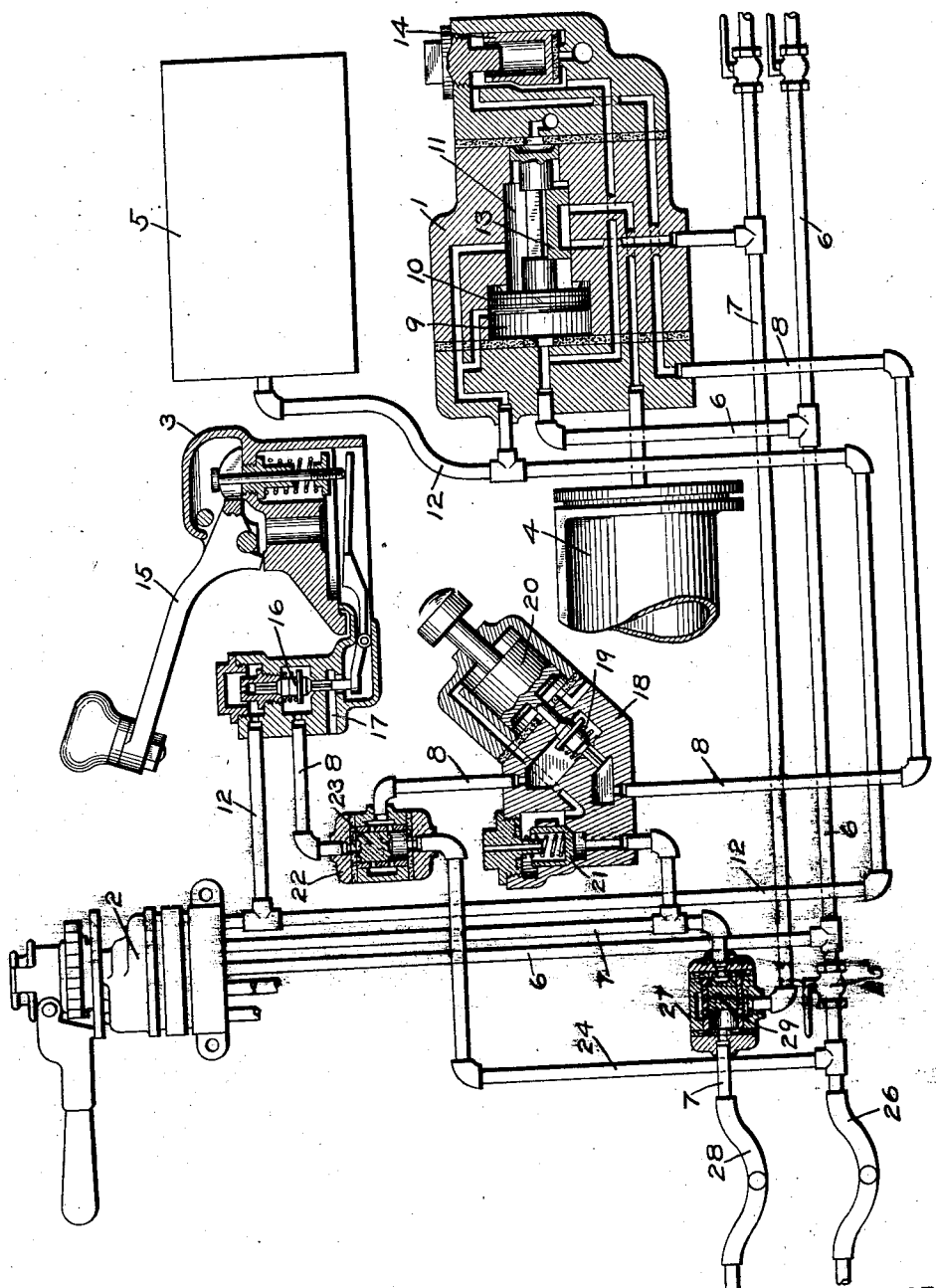
INVENTOR
ELLERY R. FITCH
BY *Wm. M. Cady*
ATTORNEY Patented Mar. 24, 1925.

1,530,487

UNITED STATES PATENT OFFICE.

ELLERY R. FITCH, OF ST. LOUIS, MISSOURI, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

Application filed May 19, 1923. Serial No. 640,159.

*To all whom it may concern:*

Be it known that I, ELLERY R. FITCH, a citizen of the United States, residing at St. Louis, and State of Missouri, have invented new and useful Improvements in Fluid-Pressure Brakes, of which the following is a specification.

This invention relates to fluid pressure brakes, and more particularly to a fluid pressure brake apparatus for a safety car control equipment.

It has heretofore been proposed to provide a safety car control equipment in which the release or removal of the controller handle will operate to open a valve so as to effect the venting of fluid from the emergency brake pipe and thus produce an emergency application of the brakes.

If cars are operated in trains of two or more cars, the controller handle on the second car of the train and other trailing cars will either be in release position or will be removed, so that the safety control pipe of the equipment will be open to the atmosphere, through the opening of the pilot valve controlled by the controller handle.

The principal object of my invention is to provide means for automatically closing communication through the safety control pipe on cars of a train except the head car or where a car is operated singly.

In the accompanying drawing, the single figure is a diagrammatic view of a safety car control equipment embodying my invention, and showing the position of the parts on the second car of a train.

As shown in the drawing, the equipment may comprise an emergency valve device 1, a brake valve device 2, a safety car controller handle device 3, a brake cylinder 4, a reservoir or source of fluid under pressure 5, an emergency brake pipe 6, a straight air pipe 7, and a safety control pipe 8.

The emergency valve device 1 may comprise a casing having a piston chamber 9 connected to the emergency brake pipe 6 and containing piston 10 and a valve chamber 11, connected through pipe 12 to the reservoir 5 and containing a slide valve 13 adapted to be operated by piston 10. A relay valve 14 is also contained in the emergency valve casing, one face of which is connected to the safety car control pipe 8.

The safety car controller handle device 3 may comprise a controller handle 15 and a double beat pilot valve 16 adapted when the controller handle is released to vent fluid from the control pipe 8 to an atmospheric exhaust 17 and when the controller handle is depressed to supply fluid under pressure from the reservoir pipe 12 to the safety control pipe 8.

There is also provided a foot valve device 18 comprising a casing containing a valve 19 for controlling communication through the safety control pipe 8 and a foot operable piston 20, the movement of which also controls the operation of valve 19, one side of the piston 20 being subject to pressure in the straight air pipe 7 as supplied thereto past a check valve 21.

According to my invention, there is interposed in the safety control pipe 8, preferably between the foot valve device 18 and the safety controller handle device 3, a double check valve device comprising a casing 22 containing a double check valve 23. One face of the double check valve 23 is connected by a pipe 24 to the emergency brake pipe 6 at a point between the usual angle cock 25 and the usual flexible hose connection 26. In one seating position of the double check valve 23, communication through the safety control pipe 8 is cut off and in the opposite seating position, communication is established through said control pipe.

On the second or other trailing cars of a train, the angle cock 25 is in its open position, establishing communication from the head car through the emergency brake pipe 6 and consequently fluid under pressure in the emergency brake pipe is supplied through pipe 24 to one face of the double check valve 23, so that said check valve is moved to the position shown in the drawing, in which communication through the safety control pipe 8 is cut off. It will thus be evident that although the controller handle 15 is in release position, as shown, or is removed, the consequent opening of the pilot valve 16 will not operate to vent fluid from the safety control pipe.

On the head car, the angle cock 25 is turned to closed position, and since the flexible hose connection 26 on the head car is unattached and is open to the atmosphere, the pipe 24 will be at atmospheric pressure, as well as the exposed face of the double check valve 23. Consequently, the controller handle 15 being held depressed by the operator on the head car, fluid under pressure from the reservoir pipe 12 will be supplied past the double beat pilot valve 23 to the double check valve 23 and will operate said double check valve so as to open communication from the pilot valve 16 through the safety control pipe 8.

The operation will now be the same as with prior equipments of this character and when the controller handle 15 is released by the operator, the pilot valve 16 will be operated to vent fluid under pressure from the safety control pipe 8 to the exhaust port 17. The venting of fluid from pipe 8 operates to effect the opening of the relay valve 14, so that fluid is vented from the emergency brake pipe 6 so as to cause the movement of the piston 10 of the emergency valve device 1 to emergency position, in which an emergency application of the brakes is effected in the usual manner.

The double check valve 23 may be interposed in the safety control pipe 8 between the foot valve device 18 and the emergency valve device 1, but I prefer to locate said double check valve in the position shown in the drawing.

The equipment shown in the drawing is of the single end type, in which the control is effected from only one end of the car, but my invention may obviously be applied in connection with a double end equipment, in which the equipment may be controlled from either end of the car.

A double check valve device 27 may be interposed in the straight air pipe 7 between the flexible hose connection 28, the straight air pipe connection to the brake valve device 2, and the straight air pipe on the car, so that when a car is coupled with another car in a train, loss of air from the straight air pipe to the atmosphere will be prevented at the brake valve on the second car when a straight air application is made from the head car and also in case the brake valve on the second car is operated in such a manner as to supply fluid under pressure to the straight air pipe, which would otherwise be vented to the atmosphere at the brake valve on the head car.

It will be evident that the double check valve 29 of the check valve device 27 will be moved to the right by pressure supplied to the straight air pipe from the head car, considering the equipment shown in the drawing as that of a second car, so that the double check valve 29 will cut off communication from the straight air pipe to the straight air connection of the brake valve on the second car while at the same time establishing communication through the straight air pipe to the brake cylinder on the second car. On the other hand, fluid supplied to the straight air pipe by manipulation of the brake valve on the second car will operate the double check valve 29 so as to cut off communication from the second car through the straight air pipe to the brake valve on the head car.

Having now described my invention, what I claim as new and desire to secure by Letters Patent, is:—

1. The combination with a safety control pipe, means operated upon venting fluid under pressure from said pipe for effecting an application of the brakes, and a valve for venting fluid from said pipe, of a fluid pressure brake pipe and a device operated by fluid pressure from said brake pipe for closing communication from said means through said safety control pipe to said valve.

2. The combination with a safety control pipe, means operated upon venting fluid under pressure from said pipe for effecting an application of the brakes, and a valve for venting fluid from said pipe, of a fluid pressure brake pipe and a double check valve operated by fluid pressure from said brake pipe for closing communication from said means through said safety control pipe to said vent valve.

3. The combination with means operated by a reduction in fluid pressure for effecting an application of the brakes, a controller handle, and a valve operated upon release of the controller handle for venting fluid pressure from said means, of an emergency brake pipe and a double check valve subject to the pressure in said brake pipe for controlling communication through which said valve vents fluid pressure from said means.

4. The combination with means operated by a reduction in fluid pressure for effecting an application of the brakes, a controller handle, and a valve operated upon release of the controller handle for venting fluid pressure from said means, of an emergency brake pipe having a hose connection for connecting same to the corresponding brake pipe of another car and provided with an angle cock, and a double check valve having one face connected to the brake pipe at the hose connection side of said angle cock for controlling communication through which said valve vents fluid from said means.

5. The combination with a fluid pressure brake apparatus including a straight air pipe provided with a hose connection for connecting the straight air pipe with the corresponding pipe of another car and a brake valve device connected to said pipe, of a double check valve for controlling communication from said hose connection through the straight air pipe and from the brake valve device to said pipe.

In testimony whereof I have hereunto set my hand.

ELLERY R. FITCH.